H. M. BECK & C. AMBRUSTER.
BATTERY CURRENT LIMITING DEVICE.
APPLICATION FILED SEPT. 14, 1908.

1,023,490.

Patented Apr. 16, 1912.

3 SHEETS—SHEET 1.

WITNESSES:

INVENTORS
Cornelius Ambruster
Harold M. Beck
BY
Augustus B. Stoughton
ATTORNEY.

H. M. BECK & C. AMBRUSTER.
BATTERY CURRENT LIMITING DEVICE.
APPLICATION FILED SEPT. 14, 1908.

1,023,490.

Patented Apr. 16, 1912.

3 SHEETS—SHEET 2.

WITNESSES:
Rob. R. Kitchel
K. W. Gilligan

INVENTORS
Cornelius Ambruster
Harold M. Beck.
BY
Augustus B Stoughton
ATTORNEY.

H. M. BECK & C. AMBRUSTER.
BATTERY CURRENT LIMITING DEVICE.
APPLICATION FILED SEPT. 14, 1908.

1,023,490.

Patented Apr. 16, 1912.

3 SHEETS—SHEET 3.

WITNESSES:
Robt R Kitchel
A. M. Gilligan

INVENTORS
Cornelius Ambruster
Harold M. Beck
BY
Augustus B Stoughton
ATTORNEY.

UNITED STATES PATENT OFFICE.

HAROLD M. BECK AND CORNELIUS AMBRUSTER, OF CHICAGO, ILLINOIS.

BATTERY-CURRENT-LIMITING DEVICE.

1,023,490.  Specification of Letters Patent.  Patented Apr. 16, 1912.

Application filed September 14, 1908. Serial No. 453,031.

*To all whom it may concern:*

Be it known that we, HAROLD M. BECK and CORNELIUS AMBRUSTER, both citizens of the United States, and residing at Chicago, in the county of Cook and State of Illinois, have invented a certain new and useful Battery-Current-Limiting Device, of which the following is a specification.

Objects of the present invention are first, to automatically limit the current at which a battery, operating in connection with a booster, may either charge or discharge, or both; second, to provide for fixing different limits upon the charge or discharge currents; third, to provide accurate means of adjustment, and fourth, to simplify the construction and arrangement of the magnetic blow out.

The invention consists in an electro-magnetic device responsive to or operated by the current, for example the battery current or the armature current of the booster motor, and adapted to cut down or weaken the booster field excitation when the current reaches a predetermined limit or limits; and further in the provision of means for fixing the limits of the operation of said device to cause it to fix the same or different limits upon the current; and further in the provision of means for fixing the relation between the charge and discharge current at which the device will operate; and further in an adjustment for varying the length as well as the tension of the spring which coöperates with said device; and further in the use and arrangement of the magnetic field of said device as a magnetic blow out for minimizing sparking when the device is of the make and break type; and further in the improvements hereinafter described and claimed.

Figure 1:
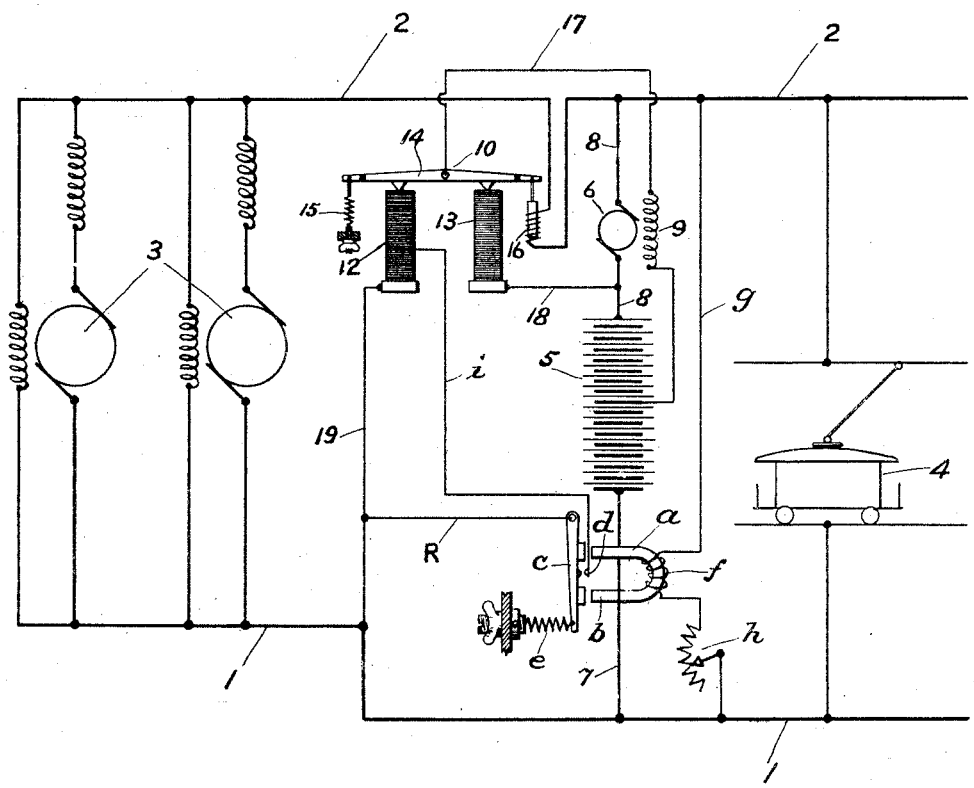
Figures 2, 8:
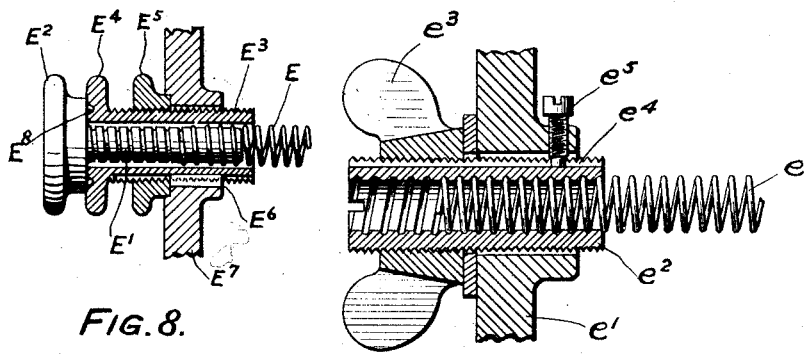
Figure 3:
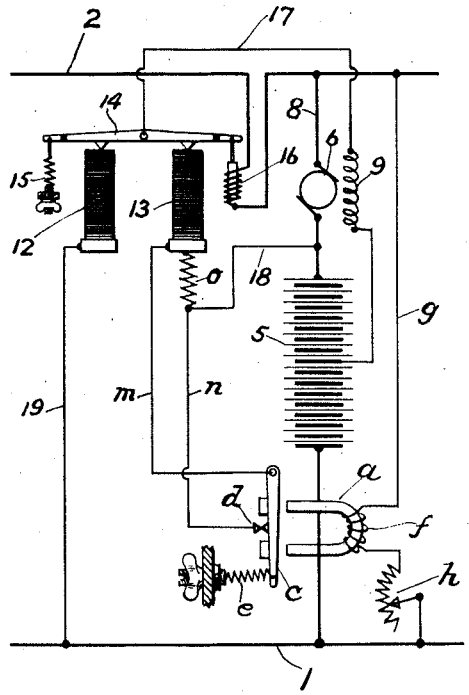
Figure 4:
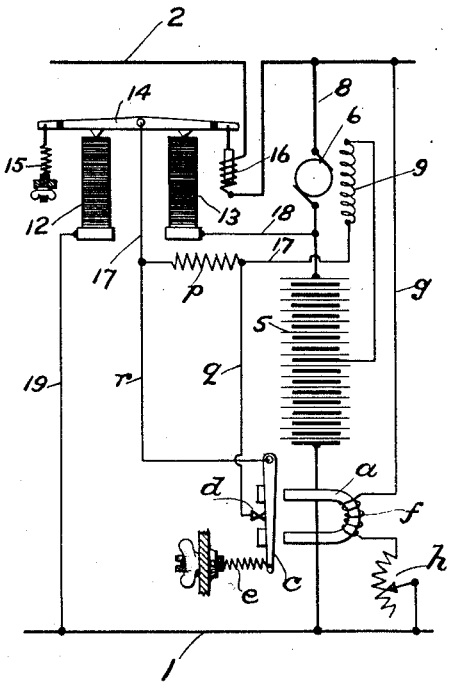
Figure 5:
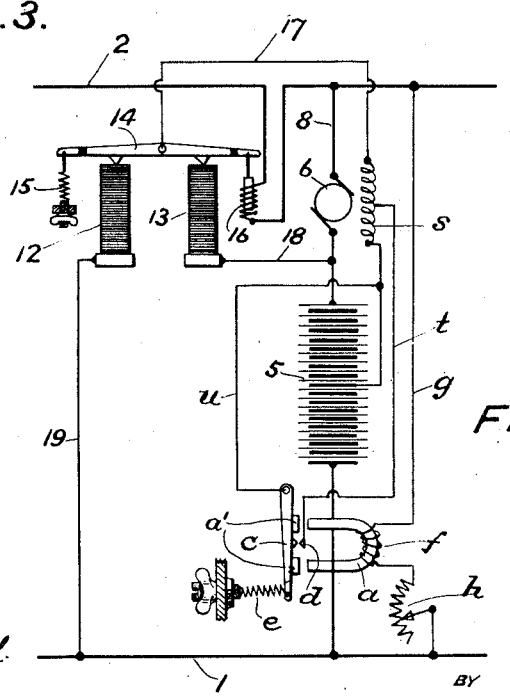
Figure 6:
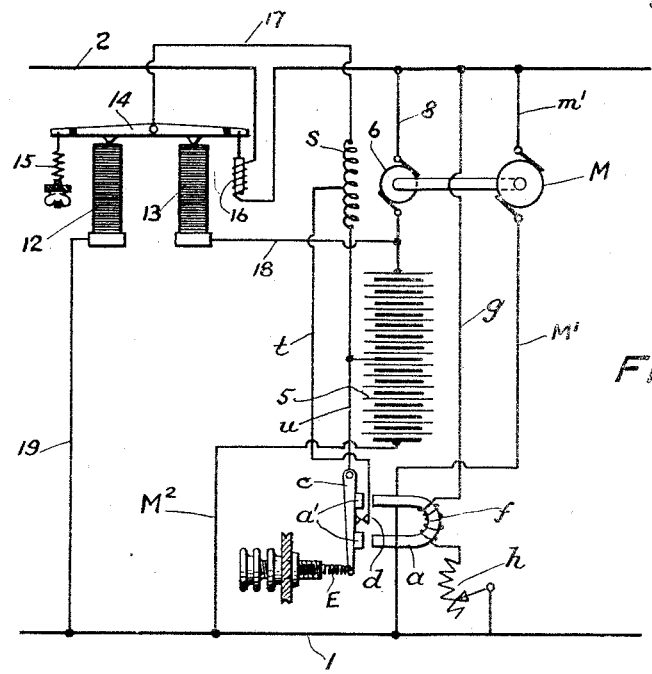
Figure 7:
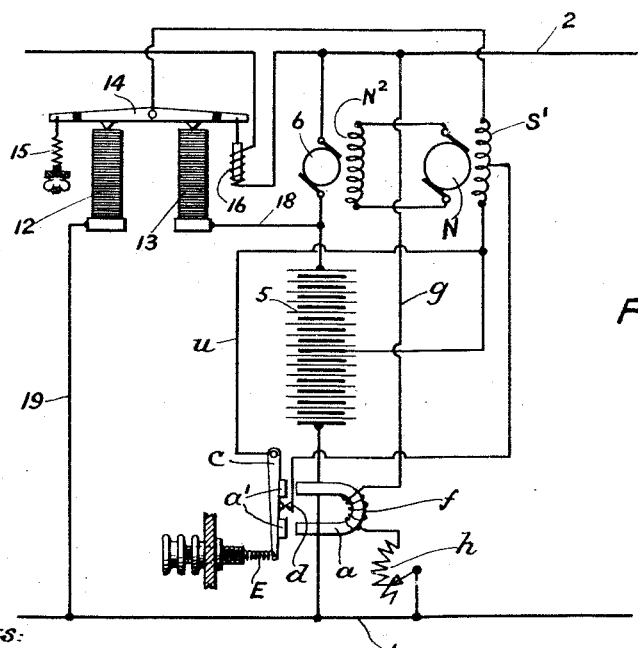

In the drawings we have illustrated for the sake of description some types of apparatus embodying features of the invention, and in them Figure 1, is a diagrammatic view of apparatus embodying features of the invention and in which the electro-magnetic device operates upon the booster regulator. Fig. 2, is a view principally in central section illustrating an adjustment embodying features of the invention. Fig. 3, is a diagrammatic view of apparatus embodying a modification of the invention and in which the electro-magnetic device operates upon or in connection with a resistance in series with the booster regulator. Fig. 4, is a similar view of apparatus embodying another modification of the invention and in which the electro-magnetic device operates upon or in connection with a resistance in series with the booster field. Fig. 5, is a similar view of apparatus embodying another modification of the invention and in which the electro-magnetic device operates upon or in connection with the booster field coil. Fig. 6, is a diagrammatic view in which the electro-magnetic device is responsive to the motor current. Fig. 7, is a similar view in which use is made of an exciter for the booster, and Fig. 8, is a sectional view illustrating a modification of the arrangement shown in Fig. 2.

In the drawings, and more particularly in connection with Fig. 1, 1 and 2, are a work circuit suitably fed as by a generator 3, and, for example, utilized in connection with trolley cars 4. 5 and 6, are a battery and booster arranged in the battery branch 7—8, across the work circuit and in parallel with the generators 3. 9, is the booster field and 10, is a booster field regulator. All of these parts are well known and are typical of usual installations.

The booster regulator shown is selected for explanation and not because our invention is necessarily coupled with the use of it. However, the booster regulator shown consists of two piles 12 and 13, as of carbon blocks, properly insulated, and of a properly insulated pivotal bar 14, one end of which is operated upon by a spring 15 and the other end of which is operated by a magnet or solenoid responsive to the electrical condition of the work circuit; in the present instance by a series or current coil 16, interposed in the conductor 2. The bar 14, is connected by a conductor 17, through the field 9 of the booster and to an intermediate point of the battery. The piles 12 and 13, are respectively connected across the ends of the battery by conductors 18 and 19. The latter is shown as connected to the conductor 1, but is in effect connected to the end of the battery.

Difference in pressure upon the piles 12 and 13, due to changes of electrical condition or fluctuations of load on the work circuit, changes the relative conductivity or resistance of the piles, so that the field of the booster is automatically changed in strength and direction in order to compel or cause the battery to charge and discharge. This is well understood and can be variously accomplished but by our invention we limit the battery current and we will proceed to describe how we accomplish this in connection with the apparatus shown and explained, but without wishing to necessarily limit the application of our invention to that apparatus.

$a$, is an electro-magnetic device responsive to the battery current or to the current in the battery branch 7—8, and it is adapted to cut down the booster field excitation when the current reaches a predetermined limit or limits. This device is shown as of the make-and-break variety and it includes a magnet $b$, excited by the battery current, or current in the battery branch, and a pivotal armature $c$, having an adjustable rectracting spring $e$, and carrying a contact which coöperates with a fixed contact $d$. A change in current in the battery branch 7—8, or in battery current, changes the degree of magnetization of the magnet $a$, and by fixing or adjusting the resistance or opposition of the spring $e$, in respect to the attraction of the magnet $a$, it is possible to permit the armature $c$, to move only when the current in the battery branch or battery current reaches a predetermined value. Furthermore it is possible to fix this limit at one value for charge and at another value for discharge by polarizing the magnet $a$, because when this is done the magnetizing effect is the algebraic sum of the effect of the battery current and of the polarizing coil.

$f$, is a polarizing coil included in a conductor $g$, arranged across the conductors or leads 1 and 2, and including an adjustable resistance $h$. The spring $e$, is adjustable both as to length and tension.

$e^1$, is a fixed support through which passes a sleeve $e^2$, threaded internally to receive the coils of the spring and externally to receive the wing or other nut $e^3$. The sleeve is lengthwise grooved at $e^4$, to receive the end of the set screw $e^5$. By withdrawing the set screw $e^5$, the sleeve can be turned, thus adjusting the length of the spring, and by inserting the set screw and turning the wing nut the tension of the spring can be adjusted. In this way a very accurate and desirable regulation of the pull of the spring is obtained. The tension of the spring on the armature is adjusted to balance a certain pull of the magnet, and the length of the spring is adjusted so that the change in tension of the spring as it is extended corresponds almost exactly with the change in pull on the armature as it moves through the magnetic field, due to the change in the length of the air gap.

Referring to Fig. 8, the spring E, engages a threaded spindle $E^1$, carried by a head $E^2$. There is a barrel or tube $E^3$, provided with a head $E^4$, and it receives the spring. This barrel or tube is externally threaded and longitudinally grooved; the threaded portion engages a nut $E^5$ and the groove engages a key $E^6$ in the support $E^7$. When the knob $E^2$ is turned the spring is screwed onto or off of its shank and when the nut $E^5$ is turned the barrel which carries the nut and spindle is shifted endwise in respect to the support $E^7$. $E^8$, are detents interposed between the knob $E^2$ and nut $E^5$ to prevent accidental movement.

The described movement of the armature $c$, which is responsive to the limiting current or currents in the battery branch, as has been explained, may be availed of for cutting down the booster field excitation in a variety of ways. In Fig. 1, this is accomplished by providing a short circuit consisting of the conductors $i$ and R, which are connected respectively with the contacts at $d$, and with the conductor 19, and an intermediate portion of the pile 12. Should the conditions be such that the battery current or current in the battery branch 7—8, reach the predetermined limit, the armature $c$, closes the contact at $d$, and thus short-circuits a portion of the pile 12 and changes the electrical relation of the two piles, so the regulator cuts down the field excitation of the booster field and prevents the battery current or current in the battery branch 7—8 from exceeding the limit. As shown in Fig. 1, the arrangement is such that a limit is placed upon the discharge current of the battery and in the arrangement of that figure the polarizing coil $f$, and its regulator $h$, constitute an aid to accurate adjustment. The effect of cutting out or short-circuiting the pile 12, is to decrease the resistance of that pile and thus permit additional current to pass by way of 19, R, $i$, 14, 17, through 9, from the battery, so that the field of the booster is cut down and the discharge current from the battery is limited.

In Fig. 3, the same results are accomplished as have been described in connection with Fig. 1, but in this case a resistance is interposed between the conductor 18 and the pile 13 and this resistance is normally short-circuited by way of conductor $n$, through the contacts at $d$, and the conductor $m$. In this instance the contacts are normally closed so that the resistance $o$, is short-circuited, but when the limiting current is reached in discharge the armature $c$ is pulled up, contact is interrupted at $d$, and the resistance $o$, is therefore included in the circuit through the pile 13, thereby increasing its resistance and causing more current to pass through the pile 12, thus cutting down the excitation of the booster field. In the case of the construction of this figure, the polarizing coil is useful as an aid to adjustment.

In Fig. 4, both the charging and discharging current is limited, either to the same or to different extents. In the construction of this figure $p$ is a resistance interposed in series with the booster field, that is interposed in the conductor 17, and normally short-circuited by the circuit $q$, contacts at $d$ and conductor $r$. In this construction and independent of the action of the piles 12 and 13, when the current reaches its limit on charge or discharge, contact at $d$, is broken and the resistance $p$, is placed in series with the booster field, thus the excitation of the latter is cut down and the battery current limited. In the arrangement of this figure the polarizing coil $f$, is available for fixing the discharge or charge current at different limits.

In the arrangement shown in Fig. 5, the same results may be accomplished as have been described in connection with Fig. 4. In the arrangement of this figure a portion $s$, or all of the field coil is arranged to be short-circuited through the contacts at $d$, by way of the conductors $t$, and $u$, when the limiting current causes contact to be made at $d$. Of course, by short-circuiting a portion or all of the field, its excitation is cut down. There is, of course a magnetic field traversing the magnet $a$, and its armature, and according to our invention we place the contacts at $d$, in this magnetic field so that it operates to blow out any arc forming between the contacts. As shown the armature may consist of two parts $a^1$, mounted on a support which is non-magnetic in the sense of being diamagnetic, and the contacts $d$, are placed in the break or division between the parts $a^1$, so as to be traversed by the lines of force.

The arrangement shown in Fig. 6, is substantially the same as that shown in Fig. 5, with the exception that the motor M, which drives the booster is shown and the circuit $M^1$, of the motor is availed of as the operating cause of the electromagnetic device. In this case the battery connection is $M^2$, and is carried clear of the magnetic device. When the battery is neither charging nor discharging, the battery voltage being approximately that of the circuit 1—2, the booster motor will be doing no work and the current in conductor $M^1$ will be substantially zero. When the battery either charges or discharges, for example, by reason of a decrease or increase of load on the working circuit, the motor will be doing work, and the current in conductor $M^1$ will increase with increase of charge or discharge, thus exciting the magnet $a$. When this current reaches a predetermined value, the magnetic pull on the arm $c$ will overcome the tension of the spring E, thus making contact at $d$ and shortcircuiting a portion of the booster field $s$, and thus, as in the other illustrations immediately reducing the voltage of the booster 6. This reduction of booster voltage will also reduce the battery current and the work of the motor. The current in conductor $M^1$ will therefore immediately decrease, releasing the arm $c$ and breaking the contact at $d$. As in other illustrations, the above described cycle of operations will be continually repeated, so long as the departure of the circuit conditions from normal exceeds that necessary to cause the make and break device to operate, thus holding substantially constant the current in the circuit to which the magnet $a$ is responsive, the variations of this current being just sufficient to cause the arm $c$ to vibrate. In Fig. 6, the coil $f$ does not give different adjustments for battery charge and discharge, since the motor current is in the same direction, whether the battery is charging or discharging.

The arrangement shown in Fig. 7, is the same as that illustrated and described in Fig. 5, with the exception that the field $S^1$, which is controlled by the electromagnetic device is made to operate upon an exciter N, which in turn excites the field $N^2$ of the booster.

What we claim is:

1. The combination of a battery branch containing a storage battery and its booster, a field for controlling the booster excitation having electrically connected with it a circuit including contacts which when opened and closed change the excitation of the booster, an electromagnetic device responsive to or operated by changes of electrical condition in the battery branch, and adapted to operate the contacts to cut down or weaken the booster excitation, and means for preventing such operation of the electromagnetic device until such changes reach a predetermined value.

2. The combination with a battery branch containing a battery and booster, of a magnet excited by the electrical conditions in the battery branch, and a make-and-break device having electrical connections to the booster field and adapted to cut down the field excitation when said electrical conditions reach a predetermined limit, substantially as described.

3. The combination of a battery branch containing a battery and booster, with a polarized electromagnetic device adapted to cut down or weaken the booster field excitation and responsive to electrical conditions of charge and discharge when the same reach different predetermined limits, substantially as described.

4. The combination of a battery branch containing a battery and booster with a polarized magnet responsive to electrical conditions of charge and discharge in different degrees, and a make-and-break device adapted to cut down the booster field excitation and responsive to a predetermined pull of the magnet, substantially as described.

5. In combination a source of electrical energy, a circuit containing a storage battery operatively arranged in respect to the source, apparatus responsive to the load on the source, and including a field coil for controlling the battery charge and discharge, and a make and break device electrically connected to the field coil and responsive to the electrical condition of the battery circuit and adapted to control the current in the field coil to limit said charge and discharge.

6. The combination of a battery and booster, and means adapted to cut down the booster field excitation and polarized whereby said means is responsive in different degree to the electrical condition of charge and discharge, substantially as described.

7. The combination of a battery and its booster, a resistance adapted to be cut into and out of the booster field circuit, and an electro-magnetic make-and-break device electrically connected thereto and adapted to cut said resistance in and out and responsive to predetermined electrical conditions of the battery circuit, substantially as described.

8. The combination of a battery and its booster, a resistance adapted to be cut into and out of the booster field circuit, and a polarized electro-magnetic device adapted to cut said resistance in and out and responsive to different predetermined electrical conditions of charge and discharge, substantially as described.

9. In combination a source of electrical energy, a circuit containing a storage battery operatively arranged with respect to the source, a field coil responsive to the load on the source for controlling the battery charge and discharge, and a make and break device electrically connected to the field coil and responsive to battery charge and discharge in excess of predetermined values but non-responsive at lesser values.

10. In combination in a system of electrical distribution, a source of electrical energy, a branch circuit containing a storage battery operatively arranged with respect to the source, apparatus responsive to the load on the source and including a field coil for controlling the battery charge and discharge, said field coil connected into a suitable regulating circuit, a make and break device electrically connected to said regulating circuit and responsive to departures of a predetermined amount from the normal conditions in the battery branch, and adapted to control the current in said field coil to limit said departures.

11. In an electrical system of distribution, the combination of a storage battery, means for controlling the battery charge and discharge and other means including an electro magnet responsive to the electrical condition in the battery circuit and polarized to limit the battery discharge at one value and the charge at another value.

12. In combination a source of electrical energy, a circuit containing a storage battery operatively arranged with respect to the source, a field coil responsive to the load on the source for controlling the battery charge and discharge, a make and break device responsive to battery charge and discharge for controlling the current in the field coil, and means for adjusting said device to vibrate continually at a certain value of battery current to limit said current to said value.

13. In combination a source of electrical energy, a circuit containing a storage battery operatively arranged with respect to the source, a field coil responsive to the load on the source for controlling the battery charge and discharge, a make and break device responsive to battery charge and discharge for controlling the current in the field coil, said device adapted to vibrate continually at a certain value of battery current to limit said current to said value and to remain quiescent at lesser values.

14. In combination a source of electrical energy, a circuit containing a storage battery operatively arranged with respect to the source, a field coil responsive to the load on the source for controlling the battery charge and discharge, and a device responsive to battery charge and discharge for controlling the current in the field coil and adapted to operate at a certain value of battery current to limit said current to said value and to remain inoperative at lesser values.

15. In combination a source of electrical energy, a circuit containing a storage battery operatively arranged with respect to the source, a field coil responsive to the load on the source for controlling the battery charge and discharge, a device responsive to battery charge and discharge, for controlling the current in the field coil, and means coöperating with said device whereby the same is made responsive to different values of battery current on charge and discharge.

In testimony whereof we have hereunto signed our names.

HAROLD M. BECK.
CORNELIUS AMBRUSTER

Witnesses:
A. B. BUSH, Jr.,
G. H. MORRIS.